Oct. 7, 1930.  P. F. GUTMANN  1,777,669
PRODUCTION OF SHEET GLASS
Filed May 21, 1925   2 Sheets-Sheet 1
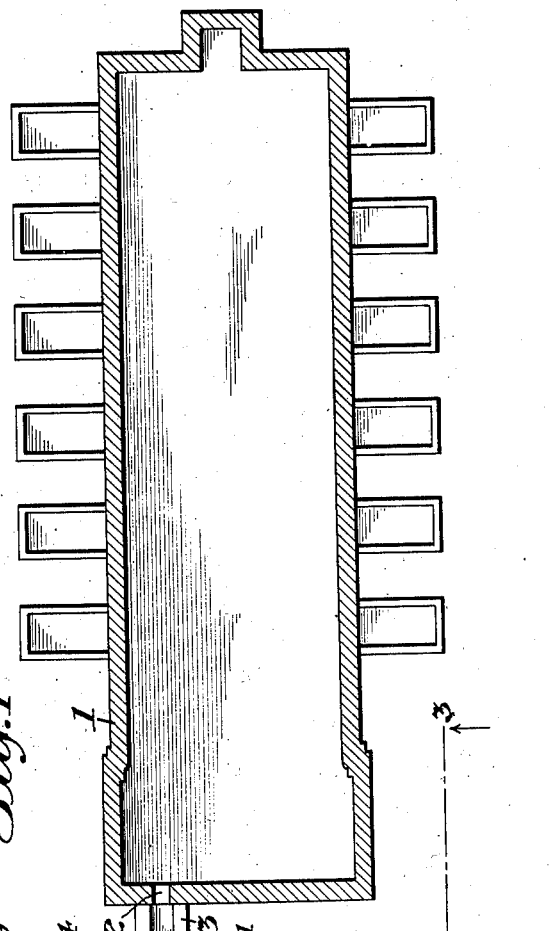
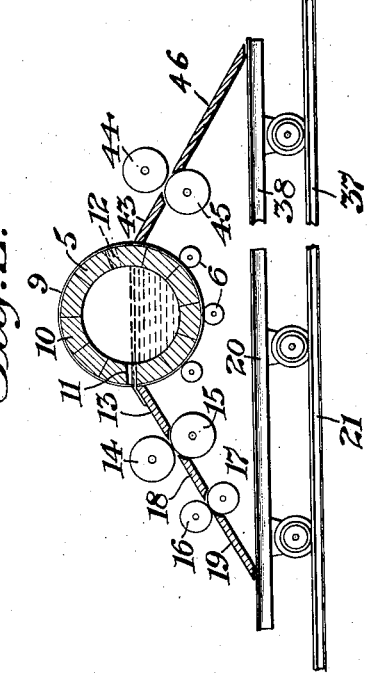
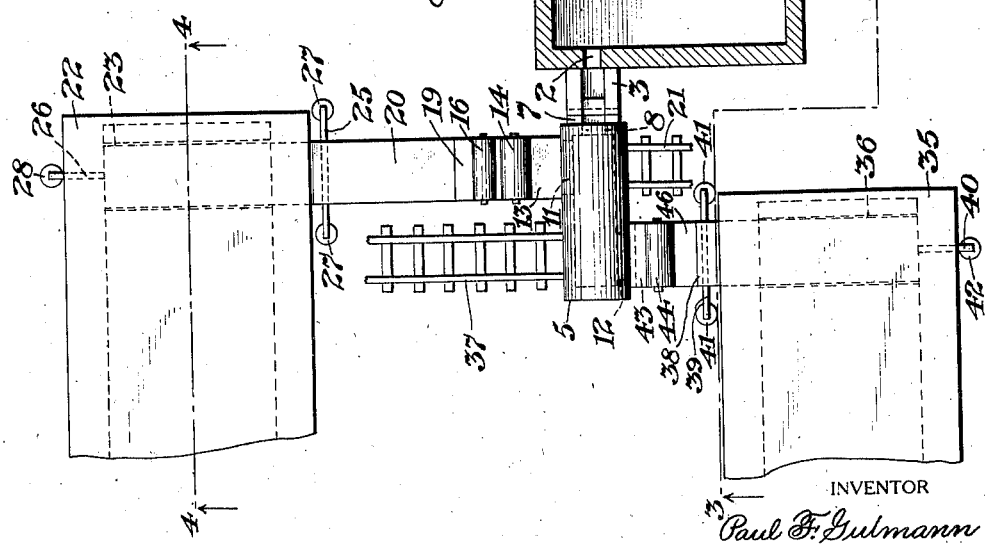
INVENTOR
Paul F. Gutmann
BY
Cooper, Kerr & Dunham
HIS ATTORNEYS Oct. 7, 1930.  P. F. GUTMANN  1,777,669
PRODUCTION OF SHEET GLASS
Filed May 21, 1925  2 Sheets-Sheet 2
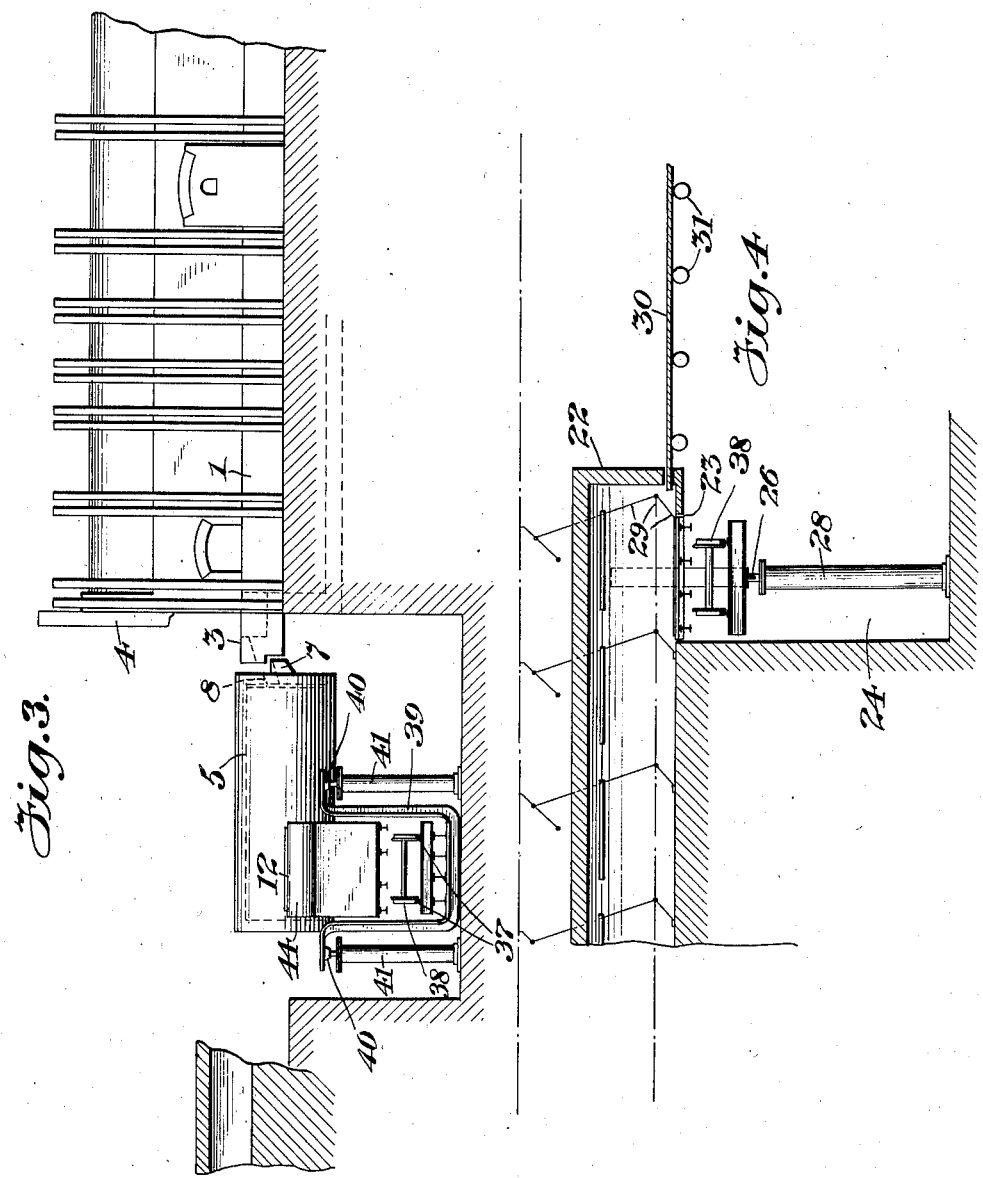
INVENTOR
Paul F. Gutmann
BY
Cooper, Kerr & Dunham
HIS ATTORNEYS Patented Oct. 7, 1930

1,777,669

UNITED STATES PATENT OFFICE

PAUL FRANK GUTMANN, OF ST. LOUIS, MISSOURI, ASSIGNOR TO MISSISSIPPI GLASS COMPANY, A CORPORATION OF NEW YORK

PRODUCTION OF SHEET GLASS

Application filed May 21, 1925. Serial No. 31,823.

My present invention relates to apparatus for melting glass, pouring it, rolling it into sheets, conveying the poured and the rolled glass, and treating the formed sheets during the cooling thereof.

In the manufacture of sheet glass I find that the rolling and forming of the molten glass into the desired form is greatly expedited by pouring the molten glass and feeding it to forming rolls in a stream having substantially the cross sectional dimensions of the finished sheet. I also find that this can be done by pouring molten glass into a crucible or the like having an opening of substantially the same cross sectional dimensions as the stream desired and then pouring the glass from such crucible through said opening onto a receiving table or to feeding rolls for further determining the shape of the desired sheet.

In transporting sheet glass from the forming means to the treating lehr I find that great saving in time, labor and space is achieved by forming the lehr with a projecting end having an opening on the lower side of said projection and feeding the formed glass by means of a table raised into said opening up to the level of the lehr floor and then sliding said glass from the table onto the floor by suitable apparatus.

I further find that an additional saving in time and other factors is attained by making said feeding crucible with a multiplicity of feeding openings and having said crucible movable to discharge glass through the different openings at will and having a multiplicity of rolling means and lehrs whereby one piece of glass can be fed to its lehr and the transporting apparatus returned to the receiving position while another is being formed.

It is therefore an object of my invention to provide means for pouring molten glass for forming sheet glass in a stream of as nearly the cross section of the finished sheet as is practicable, allowance of course being made for finishing, contraction, etc.

It is further an object of my invention to provide efficient and labor saving apparatus for transporting the sheet glass from the forming means to the treating lehr.

Further objects of my invention will be apparent from the specification and drawings forming a part thereof.

In the drawings which form part of this application,

Fig. 1 is a plan view of a glass melting furnace in horizontal section, in operative relation with two lehrs, with discharge apparatus, forming rolls, and conveying apparatus therebetween.

Fig. 2 is a vertical section in elevation of the furnace discharge apparatus of Fig. 1, Fig. 3 is a vertical section view along the line 3—3 of Fig. 1, and Fig. 4 is a vertical section in elevation of one of the lehrs of Fig. 1 taken along the line 4—4.

In the drawings the melting furnace 1 has formed in one of its walls the discharge port 2 which opens above the lip or spout 3 into which fits the closure 4 for said port 2. Opposite and axially aligned with said port 2 is mounted the discharge drum 5 supported by the rollers 6, 6 and rotatable thereby or by other means. The receiving spout 7 on said drum 5 and positioned under the discharge spout 3 of furnace 1 connects with the interior of said drum through an opening 8 in the end of said drum. The drum 5 is of ordinary refractory structure such as sheet metal drum 9 with the lining 10 of firebrick suitable for handling molten glass and having necessary openings therethrough as herein described. In one side of said drum 5 is formed the horizontal opening 11 parallel with the axis of the drum and of a length equal to the width of sheets of glass desired to be formed from the molten glass poured therethrough. On the other side of drum 5, but at less than 180° therefrom, is formed the similar opening 12, said drum 5 being tiltable in the direction of either opening for pouring therethrough as desired. The rolls 6 under the drum 5 and in the drawing shown diagrammatically serve for this rotation of the drum for pouring or for raising the openings 11 or 12 above the level of the liquid glass therein. For receiving the molten glass from opening 11 is the slide 13 positioned with its upper side at the level of discharge position of said opening 11. At the lower edge of slide 13 are positioned the forming rolls 14 and 15 between which and the rolls 16 and 17 is another slide member 18. Another slide member 19 receives the glass sheet from the rolls 16, 17 and delivers it to the flat car or utile table 20 (see Fig. 3) which is caused to travel over track 21 in the direction of the feeding of said glass through said rolls and at a rate of speed equal to the delivery rate of said glass from said rolls 16, 17, whereby the sheet glass is laid on the car 20 as it passes from the slide member 19.

Track 21 extends parallel with the end of lehr 22 and under said end in register with the opening 23 in the lower side of end, said track and car being located in the pit 24 for convenience of discharge of said furnace and rolls. The end of said track 21 which is under the end of said lehr 22 is separate from the rest thereof and slung on the U-frame 25 (see similar part 39 in Fig. 2) at the inner end and on the Z-bar 26 at the other which, in turn, are supported between the jacks 27, 27 and on the jack 28 respectively which serve when the car 20 is on the lehr section of the track to raise that section of the track and the car upwardly to bring the surface of said car to the level of the floor of said lehr 22 and into said opening 23 (see Fig. 4) where the apparatus 29 moves the sheet of glass carried by said car from the car onto and along the floor of the lehr. The closure 30 slidable on the rollers 31, 31 serves to close said opening 23 between car discharging operations.

Under the opening 12 of said drum 5 and under the end of lehr 35 and opening 36 therein runs the track 37 which carries thereon the car 38 and is suspended on the U-frame 39 (see Fig. 2) and on Z-bar 40 which, in turn, are supported by the jacks 41, 41 and on the jack 42 respectively, and which jacks serve to lift said car when in register with the opening 36 up to the level of the floor of said lehr 35 and into said opening. Between said drum 5 and the car 38 are the slide member 43, the forming rolls 44, 45, and the slide member 46 which delivers sheet glass from the rolls 44, 45 to said car 38.

In the operation of the apparatus of my invention molten glass from the furnace 1 is admitted through the port 2 thereof and over spout 3 onto the spout 7 of the drum 5, from which it flows through opening 8 in the end of said drum and into the body of the drum which is filled to the desired level. The drum 5 is then rotated on its axis by means of the rollers 6, 6 to bring opening 11 thereof, for instance, below the level of said liquid glass therein and whereby said glass is allowed to flow over the slide member 13 and between the rolls 14 and 15 which forms the stream of glass into uniform thickness. The stream now flows over slide member 18 and between rolls 16 and 17 where it is further rolled out to the desired and finished thickness and from which it flows over the slide 19 and onto the car 20. As the stream or sheet of glass flows or slides from said member 19 said car is moved on track 21 in the direction of the movement of said glass and at substantially the same rate of speed as that of the glass from said rolls 16 and 17. When the desired length of sheet glass has been formed by said rolls 16 and 17 it is cut off, as by tilting the drum 5, and pulled by the movement of said car from said slide 19 until the entire sheet is on the car. When substantially the amount of glass required to form the desired length is poured from said drum 5 to said rolls it is, of course, not necessary to cut the glass.

The car then with a sheet of glass thereon is moved further over track 21 to a position underneath the end of lehr 22 and in registry with said opening 23 in the underside thereof. Jacks 27, 27 and 28 are then actuated to raise said car and the sheet of glass thereon to the level of the floor of said lehr. The closure 30 is removed from said opening 23 as the car approaches the level of the lehr floor. The sheet of glass is then automatically moved from the car and onto the floor of said lehr by the sheet moving apparatus 29.

While the car 20 is being moved to its position under and up to the level of the lehr floor the drum 5 is in one mode of operation of the apparatus again filled with molten glass from the furnace 1 and is rotated about its axis but in a direction opposite to that first described and the glass therefrom fed through opening 12 onto slide 43 and through forming rolls 44 and 45, over slide 46 and onto the car 38 in a manner similar to that described for the feeding of a sheet of glass onto the car 20. Car 38 is then moved over track 37 to a position under the end of lehr 35 and in registry with the opening 36 therein where it and the sheet of glass thereon are raised by means of jacks 41, 41 and 42 to the level of floor of said lehr where the glass sheet is moved onto the lehr floor in a manner and by apparatus similar to that above described for lehr 22.

The alternate feeding from one side and then the other of said drum 5 on to one car and then the other and the alternate feeding of the finished sheets of glass to the lehrs 22 and 35 is continued as desired. However, when conditions require either one of roll sets may be used alone for taking glass from said drum 5 and feeding the forward sheet to the lehr.

What I claim is:

1. In combination with a glass melting furnace having an out port, a drum of refractory material in operative relation with said port, an intake opening in one end of said drum, means for conveying molten glass from said furnace to said drum, long narrow openings in the side of said drum parallel to the axis thereof and at opposite sides thereof, means at each side of said drum and in operative relation to said side openings for receiving molten glass therefrom, and means for rotating said drum axially in either direction to bring either of said openings below the level of liquid glass in said drum to pour it therethrough.

2. In combination with a glass melting furnace, means for receiving molten glass therefrom and delivering it in a wide shallow stream comprising a drum of refractory material having long narrow openings parallel to the axis thereof and at opposite sides thereof, and means for rotating said drum in either direction.

In testimony whereof I hereto affix my signature.

PAUL FRANK GUTMANN.